C. W. EISENMANN, J. S. HODEL AND G. W. BAIER.
FEED REGULATOR.
APPLICATION FILED MAR. 20, 1916.
1,312,314.
Patented Aug. 5, 1919.
3 SHEETS—SHEET 1.
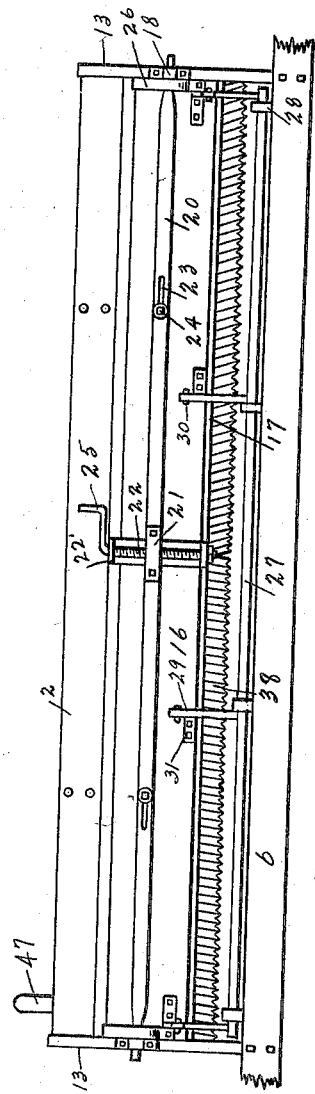
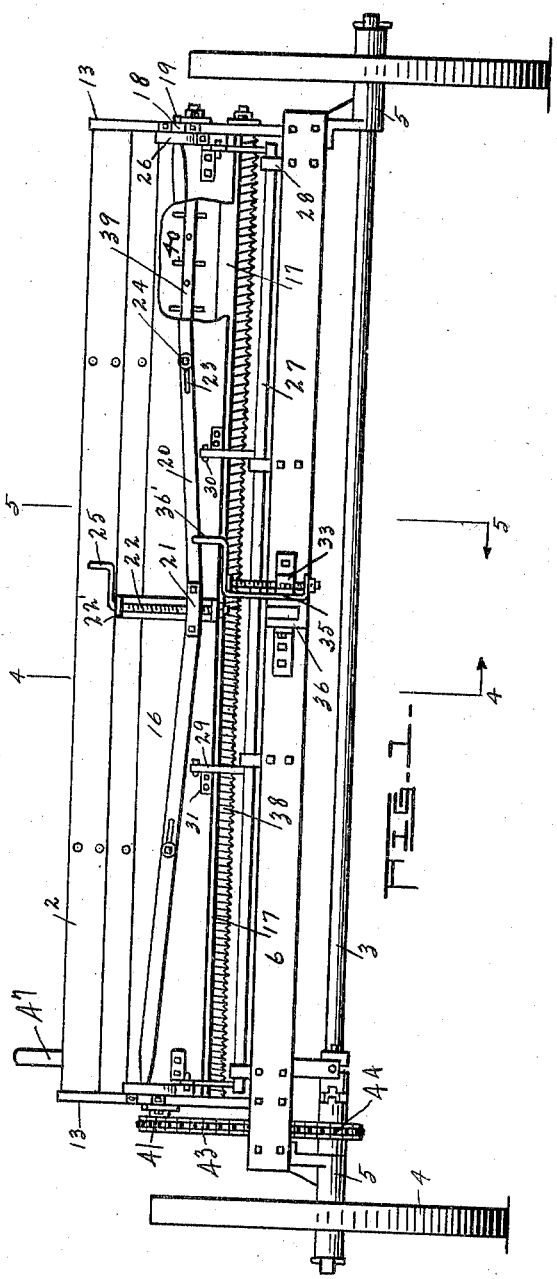

C. W. EISENMANN, J. S. HODEL AND G. W. BAIER.
FEED REGULATOR.
APPLICATION FILED MAR. 20, 1916.
1,312,314.
Patented Aug. 5, 1919.
3 SHEETS—SHEET 2.
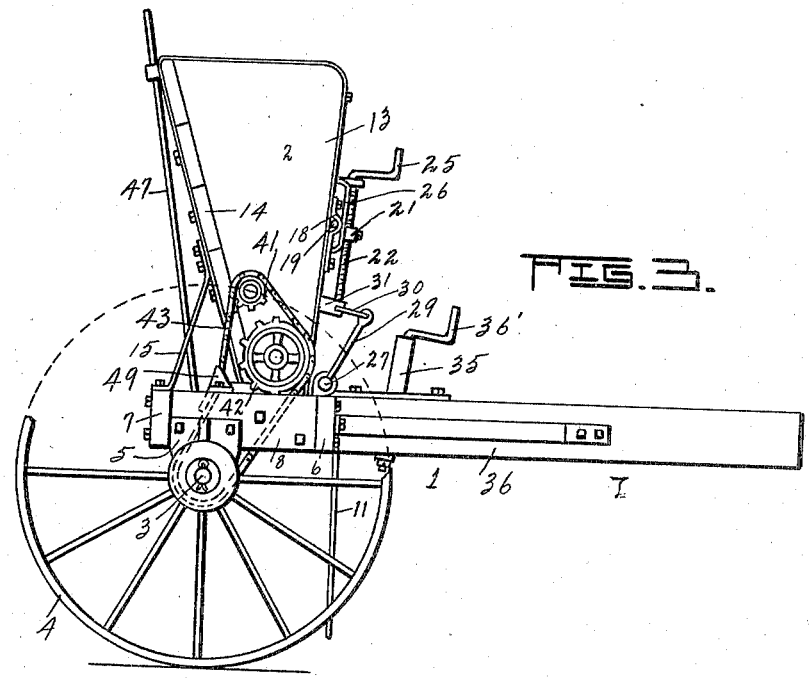
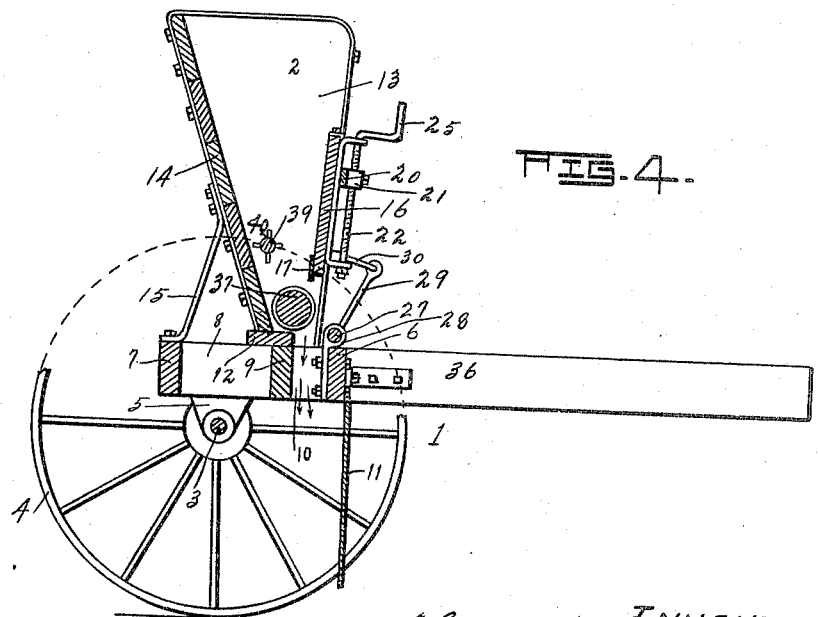

C. W. EISENMANN, J. S. HODEL AND G. W. BAIER.
FEED REGULATOR.
APPLICATION FILED MAR. 20, 1916.
1,312,314.
Patented Aug. 5, 1919.
3 SHEETS—SHEET 3.
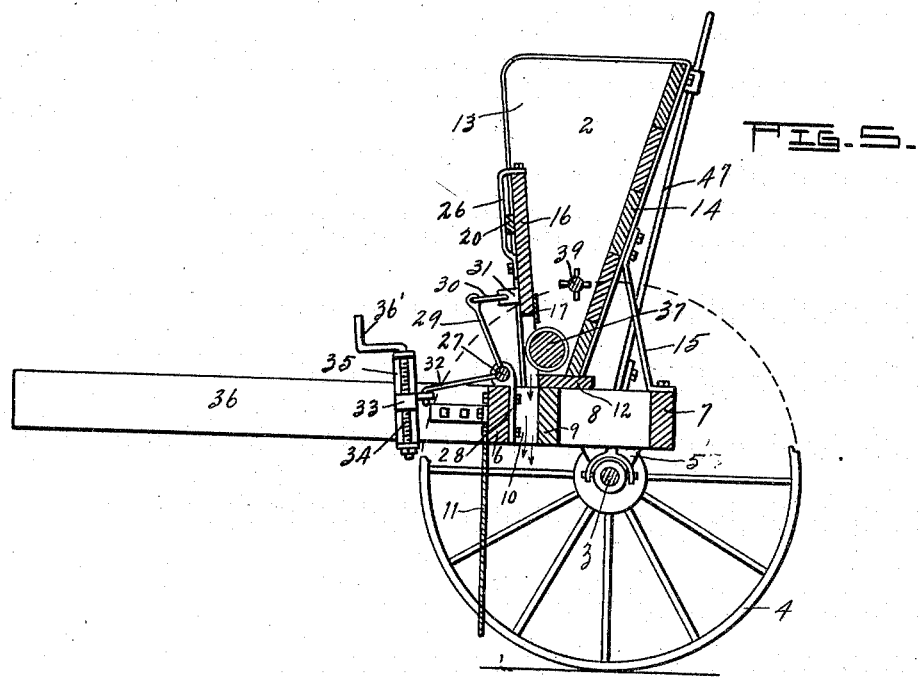
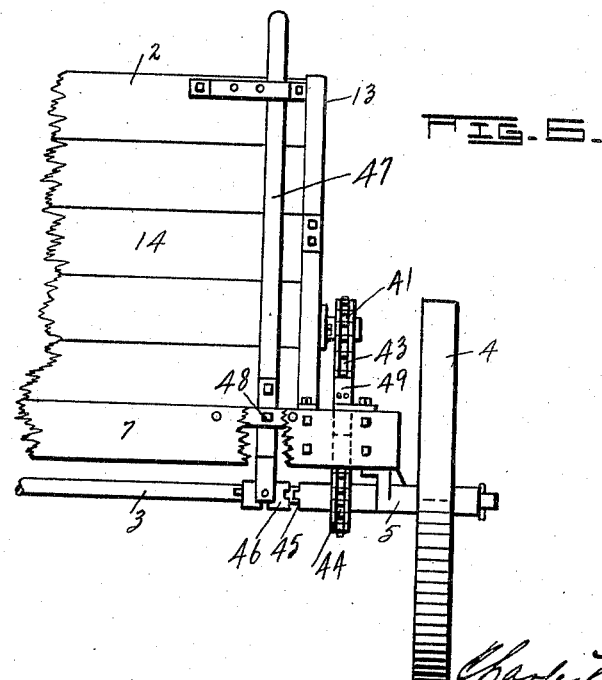

UNITED STATES PATENT OFFICE.

CHARLES W. EISENMANN, JOHN S. HODEL, AND GEORGE W. BAIER, OF CISSNA PARK, ILLINOIS, ASSIGNORS TO CHARLES W. EISENMANN AND JOHN S. HODEL, OF CISSNA PARK, ILLINOIS.

FEED-REGULATOR.

1,312,314.  Specification of Letters Patent.  Patented Aug. 5, 1919.

Application filed March 20, 1916. Serial No. 85,397.

*To all whom it may concern:*

Be it known that we, CHARLES W. EISENMANN, JOHN S. HODEL, and GEORGE W. BAIER, citizens of the United States, residents of Cissna Park, in the county of Iroquois and State of Illinois, have invented new and useful Improvements in Feed-Regulators, of which the following is a specification.

This invention has reference to fertilizer distributing machines, and has for one of its objects to produce a distributer adapted to be attached to and drawn over the field in the rear of a wagon or suitable vehicle, and provided with a hopper adapted to contain the fertilizer material, and also a feed roller, and means for regulating said feed.

The present invention relates to that type of machine disclosed in the copending application of C. W. Eisenmann, filed February 8, 1915, bearing Serial Number 6688, one of the joint applicants to this application.

In said copending application of C. W. Eisenmann, referred to, the feed roller is mounted so high, that when the material is discharged, if it is in a granular form, the wind will carry it, and the construction is such that the material must pass over frame parts with a tendency to deflect the material, and the gage board forming the closure, which must be adjusted to allow the material to discharge, is elevated from opposite sides of the machine, requiring two men to operate the same.

In the present structure the feed roller is mounted low; a feed-way is provided for the passage of the material from the feed roller to the ground, and provision is made for the use of a wind-shield if desirable; also, the means for raising or lowering the gage board, and the means for swinging the gage board in and out is simplified, and one man may actuate either or both from a point central of the machine.

Other objects and advantages of the invention will hereinafter appear, and the novel features thereof will be specifically defined by the appended claims.

The invention is clearly illustrated in the accompanying drawings, which, with the numerals of reference marked thereon, form a part of the specification, in which:

Figure 1 is a front elevation of our improved machine, the gage board in a lowered position, and part thereof broken away to show the agitating shaft;

Fig. 2 is a partial front elevation, somewhat similar to Fig. 1, except that the gage board is shown in an elevated or raised position;

Fig. 3 is an end elevation of the machine, looking at the left hand end of Fig. 1;

Fig. 4 is a vertical cross-section, as the same would appear if taken on the line 4—4 of Fig. 1;

Fig. 5 is a vertical cross-section, as the same would appear if taken on the line 5—5 of Fig. 1, and Fig. 6 is a partial rear elevation of the machine showing the clutch devices for controlling the transmission of power from the main axle or driving shaft, to the feed roller and agitating shaft.

The machine comprises a truck 1 and a hopper 2 supported thereon.

The truck 1 includes the main axle or driving shaft 3, on which are mounted ground wheels 4. The hubs of these wheels are provided with any well known ratchet construction which will revolve the axle 3 when the truck is drawn forward, but which will be thrown out or released when the truck is moved backward. The axle or driving shaft 3 passes through and is journaled in brackets or boxings 5, and said brackets or boxings 5 are attached to and support a frame work on which the hopper 2 and operative parts of the machine are mounted. This frame work includes the spaced front and rear longitudinal bars 6 and 7, the end cross pieces 8 connecting the same, and the longitudinally disposed bar 9 which is positioned between the bars 6 and 7 to provide the feed-way 10 for the passage of and to guide the fertilizing material from the hopper to the ground. From the bar 6 may be suspended the wind-shield 11, see Fig. 4, to prevent the material being blown and diverted from its path during distribution thereof.

The hopper 2 has the bottom 12 which is secured to the longitudinal bar 9 and the end cross pieces 8; the front face of the bottom 12 and the front wall of the bar 9 are in the same vertical plane, see Fig. 4. Said hopper further includes the end walls 13 and the rear inclined wall 14, said hopper being braced by the straps 15 secured to the rear wall of the hopper and the rear bar 7. The hopper 2 has no front wall, but is provided with a gage board 16 forming a closure for the hopper and to control the discharge of the material from the hopper. This board extends the full width of the hopper and may be raised to permit the discharge of the material the full width of the machine, and swung out to increase the size of the discharge opening. On the lower part of the gage board 16 is secured a metal plate 17 which extends the full width of the machine and guards the lower edge of the board to prevent the wearing away or chipping of the same by the coarse and lumpy material which may be discharged from the machine. This plate also will form a tight closure when the board is lowered and said plate caused to engage the feed roller. The means for raising and lowering the gage board and for swinging it in and out will now be described.

Bearings 18 are secured in suitable positions on the front edge walls of the end walls 13 of the hopper. Journaled in these bearings 18 and adapted to have both an oscillating and reciprocating motion therein, are the rounded ends 19 of the lever bars 20. The inner ends of these lever bars are connected to a nut 21 engaging and movable on a vertically disposed threaded stem 22, and said lever bars 20 are slotted as at 23 and passing through these slots and secured in the gage board 16 are studs 24. To actuate the stem 22 we provide a crank 25 and by rotating said crank the nut 21 may be caused to move down or upon said stem. When the nut 21 is lowered on the stem, the lever bars will move endwise across the studs 24, said studs being the bearing point at which pressure is applied to uniformly lower the entire gage board 16. Reversing the movement of the crank will elevate the nut 21 on the stem 22 and raise the gage board 16 to clear the way the full width of the machine for the discharge of the material. Straps 26 are secured to the gage board 16, and bowed as shown in Fig. 5 to guide the lever bars 20. The stem 22 is journaled in a bracket 22' secured to the gage board 16.

To swing the lower part of the gage board 16, in or out, to increase or diminish the width of the opening through which material is discharged from the hopper, we provide the rocking rod 27 which extends longitudinally across the machine and journaled in boxings or bearings 28 secured to the front bar 6 of the truck frame. Secured to this rod at suitable points are crank arms 29 and these arms have a pivoted connection with the links 30, which in turn, have a pivotal connection with brackets 31 secured to the gage board 16. Secured to the rod 27 at or near a central point between its ends, is a bar 32 and said bar is in turn connected to a nut 33 engaging and movable on a substantially vertically disposed threaded stem 34, said stem being journaled in a bracket 35 secured to the tongue 36 of the machine. To actuate the stem 34 we provide a crank 36' and by rotating said crank the nut 33 may be caused to move down or upon said stem. When the nut 33 is lowered on the stem 34, the gage board 16 will be swung outwardly on its journal bearings, composed of the bars 20 and the bearings or boxings 18, and when the nut 33 is elevated on the stem 34 the board 16 may be swung inwardly, or returned to its normal position. Thus it is obvious that by a very simple and conveniently located mechanism, one operator may raise or lower the gage board 16, or swing the same out or in.

37 designates a feed roller, the opposite ends of which are journaled in suitable bearings secured to the end walls 13 of the hopper 2. This roller is preferably provided with helical grooves 38 extending in opposite directions from the center of said roller, and are so arranged that when said roller is rotated, material will be forcibly carried over the roller and beneath the lower edge of the gage board and passing down through the feed-way 10 will be deposited on the ground, and will feed the larger and heavier particles of the fertilizer away from the ends of the machine and prevent wear.

39 designates a well known type of agitating shaft having the series of radially disposed pins 40 to keep the fertilizing material in agitation during the rotation of said shaft. The ends of this shaft are journaled in suitable bearings or boxings secured to the end walls 13 of the hopper.

To drive the feed roller 37 and agitating shaft 39, sprocket wheels 41 and 42 are secured on corresponding ends of their respective shafts and a single chain 43 engages said wheels, being driven from a sprocket wheel 44 on the main axle or driving shaft 3. The sprocket wheel 44 runs loose on the main axle or driving shaft 3 and is provided with a hub having a clutch face 45. Adapted to engage said clutch face 45 is a clutch member 46 having a spline and groove connection with the main axle or shaft 3. To operate the clutch part 46 we provide a lever 47 fulcrumed at 48 to the frame of the truck. A guide casting 49, see Fig. 3, which is adjustably secured on one of the end pieces 8 serves as a chain tightener for the chain 43.

The machine is drawn behind a wagon, by attaching the tongue 36 thereto, in any suitable manner, and the hopper 2 supplied with material from the wagon.

It is obvious that various changes may be made in the structure without departing from the spirit and scope of the invention, and we, therefore, do not wish to be limited to the details shown and described.

What we claim is:—

1. In a machine of the character described, in combination, a hopper, a gage board to control the discharge of material from said hopper, lever bars connected with said board and supporting the same on the hopper, means operatively connected with the inner ends of said lever bars for raising and lowering said board, and means for moving the lower part of said board in and out, said boards swingable on said lever bars.

2. In a machine of the character described, in combination, a hopper, bearings on the hopper, a gage board to control the discharge of material from said hopper, lever bars connected with said board and having ends journaled in said bearings and adapted to oscillate and have longitudinal movement therein, means operatively connected with the inner ends of said lever bars for raising and lowering said board, and means for moving the lower part of said board in and out.

3. In a machine of the character described, in combination, a hopper, bearings on the hopper, a gage board to control the discharge of material from said hopper, lever bars connected with said board and having ends journaled in said bearings and adapted to oscillate and have longitudinal movement therein, a member including a nut connecting the inner ends of said lever bars, a rod having a threaded connection with said nut, means for operating said rod to raise and lower the inner ends of said bars and with the same said board, and means for moving the lower part of said board in and out.

4. In a machine of the type set forth, in combination with a hopper having a discharge outlet, a gage board forming a closure for said outlet, a pair of slotted bars, studs extending through the slots of the bars and connected to the board, fixed means to fulcrum the outer ends of the bars, a vertical turnable screw and means connecting the inner ends of the bars to the screw whereby upon turning of the screw said means will be either raised or lowered and the bars will be rocked about their fulcrum points to raise or lower the studs and thereby raise or lower the board in true horizontal planes.

5. In a machine of the character described, in combination, a hopper, a gage board to control the discharge of material from said hopper, bearings on said hopper, a pair of lever bars disposed longitudinally of the gage board and having rounded ends journaled in said bearings and adapted to have longitudinal and oscillatory movement therein, said lever bars provided with longitudinal slots, studs connected with the gage board and operating in the slots of the lever bars, means operatively connected with the inner ends of said lever bars for raising and lowering said board, and means for moving the lower part of said board in and out by oscillating said bar ends in said bearings.

6. In combination with a hopper having a discharge outlet, a gage board forming a part of said outlet, a pair of oppositely disposed bars, means to fulcrum the outer ends of said bars, means to raise or lower the inner ends of said bars, and means movably connecting each of the respective bars to the board whereby to effect raising or lowering of the board upon movement of the said raising and lowering means.

7. In combination with a hopper having a discharge outlet, a gage board forming a part of said outlet, a pair of means to effect vertical raising and lowering of the board and being connected thereto, means to fulcrum each of said means whereby to allow the board to move horizontally in addition to said vertical movement thereof, means to effect horizontal swinging of the board in any vertical position thereof, and means to effect movement of said pair of means about their respective fulcra to raise or lower the board.

CHARLES W. EISENMANN.
JOHN S. HODEL.
GEORGE W. BAIER.

Copies of this patent may be obtained for five cents each, by addressing the "Commissioner of Patents, Washington, D. C."